(12) United States Patent
Tatem et al.

(10) Patent No.: US 8,726,320 B1
(45) Date of Patent: May 13, 2014

(54) SYSTEM AND METHOD FOR PROVIDING SERVICE TO A MULTI-DWELLING UNIT

(71) Applicant: The DIRECTV Group, Inc., El Segundo, CA (US)

(72) Inventors: Richard B. Tatem, Middletown, MD (US); Sayedalireza Pezeshki, Chevy Chase, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/670,137

(22) Filed: Nov. 6, 2012

(51) Int. Cl.
*H04N 7/173* (2011.01)
*H04N 7/16* (2011.01)
*H04N 7/18* (2006.01)

(52) U.S. Cl.
USPC ............... 725/71; 725/78; 725/127; 348/730

(58) Field of Classification Search
USPC ........ 725/71, 78, 127, 79, 105, 119; 348/725, 348/730
See application file for complete search history.

(56) References Cited

U.S. PATENT DOCUMENTS

| | | | |
|---|---|---|---|
| 4,518,993 A | 5/1985 | Okada et al. | |
| 4,675,732 A | 6/1987 | Oleson | |
| 5,029,232 A | 7/1991 | Nall | |
| 5,303,295 A | 4/1994 | West et al. | |
| 5,461,427 A | 10/1995 | Duffield et al. | |
| 5,787,335 A | 7/1998 | Novak | |
| 5,959,592 A | 9/1999 | Petruzzelli | |
| 6,023,603 A | 2/2000 | Matsubara | |
| 6,434,747 B1 | 8/2002 | Khoo et al. | |
| 6,622,307 B1 * | 9/2003 | Ho | 725/120 |
| 6,804,828 B1 * | 10/2004 | Shibata | 725/149 |
| 6,810,413 B1 | 10/2004 | Rajakarunanayake et al. | |
| 6,922,844 B1 | 7/2005 | Arsenault et al. | |
| 7,039,937 B1 | 5/2006 | Glenn | |
| 7,043,750 B2 | 5/2006 | Ina | |
| 7,240,357 B1 | 7/2007 | Arsenault et al. | |
| 7,917,931 B2 * | 3/2011 | Bertonis et al. | 725/81 |
| 8,082,570 B2 * | 12/2011 | Olson et al. | 725/125 |
| 8,280,326 B2 * | 10/2012 | Fenkes et al. | 455/180.2 |
| 8,510,782 B2 * | 8/2013 | Wells et al. | 725/78 |
| 2001/0037512 A1 | 11/2001 | Flickner et al. | |
| 2003/0129960 A1 | 7/2003 | Kato et al. | |

(Continued)

FOREIGN PATENT DOCUMENTS

EP 0534278 A1 3/1993
WO 2008/118458 A1 10/2008

OTHER PUBLICATIONS

SatPro.tv; "8 Way DIRECTV Zinwell Multiswitch HD 6×8 (WB68) or the (MS6X8WB-Z)"; Nov. 1, 2009; XP002718572; retrieved from the Internet: URL:http://www.satpro.tv/ms6x8wb-z.aspx; [retrieved on Jan. 10, 2014].

(Continued)

*Primary Examiner* — Pankaj Kumar
*Assistant Examiner* — Reuben M Brown (57) ABSTRACT

A system and method for distributing television signals includes a multi-switch module multiplexing television signals therethrough. The system further includes a plurality of unit configurations having respective power sources therein. The plurality of unit configurations receives the television signals. The system also includes a splitting module in communication with the multi-switch module and the plurality of unit configurations whereby at least one of the plurality of unit configurations powers the multi-switch module.

25 Claims, 7 Drawing Sheets

(56) References Cited

U.S. PATENT DOCUMENTS

2004/0107445 A1* 6/2004 Amit .............................. 725/127
2005/0107052 A1* 5/2005 Zangerl ......................... 455/129
2011/0151769 A1* 6/2011 Fitzpatrick ................... 455/3.01
2013/0182190 A1* 7/2013 McCartney ................... 348/730

OTHER PUBLICATIONS

Geekzone; "Multiple STB Advice"; Sep. 2, 2008; XP002718586; retrieved from the Internet: URL:http://www.geekzone.co.nz/forums.asp?forumid=83&topicid=40568; [retrieved on Jan. 13, 2014]; responses #251978, 252598, 252601.

SatPro.tv; "Holland 2-way Splitter All Port Power 15-2150 MHz W/Diode (HFS-2D)"; Dec. 9, 2011; XP002718571; retrieved from the Internet: URL:http://www.satpro.tv/hfs-2d.aspx; [retrieved on Jan. 13, 2014].

International Search Report and Written Opinion dated Jan. 27, 2014 in International Application No. PCT/US2013/068575 filed Nov. 5, 2013 by Richard B. Tatem et al.

* cited by examiner

SYSTEM AND METHOD FOR PROVIDING SERVICE TO A MULTI-DWELLING UNIT

TECHNICAL FIELD

The present disclosure relates generally to communicating between a service provider and a user device, and, more specifically, to providing service to multi-dwelling units.

BACKGROUND

The statements in this section merely provide background information related to the present disclosure and may not constitute prior art.

To facilitate satellite broadcast service for a residential subscriber, a satellite service provider installs one or more "satellite dish" antennas at the subscriber's residence. The satellite dish is positioned to provide an unobstructed line-of-sight (LOS) with the satellite service provider's satellite(s) for signal reception. For rural single-family residences, the satellite dish will commonly be placed on the roof, attached to an exterior wall with appropriate (e.g., southern) exposure, or mounted on a pole in the yard, as long as line of sight with the satellite is not obstructed by trees, mountains or other structures.

For potential subscribers in more urban, higher-density housing environments, such as "multi-dwelling units" (MDU) in which individual housing units for residents or tenants are contained within one building or several buildings within one complex (e.g., apartments, condominiums, office suites, commercial and hotels), the provision of individual satellite dishes to each subscriber may be impractical or even prohibited. Not all residents of multi-dwelling units have an exterior wall or balcony with appropriate exposure, and those that do may be blocked by adjacent structures. Additionally, building codes and community rules (e.g., condominium association rules) may restrict the use of satellite dishes.

To address these issues, satellite service providers may install local content distribution systems within hotels and large multi-dwelling units to service multiple units/subscribers from a single satellite dish resource. Such systems include rack mounted components, servers and the like, and require the owner/landlord of the multi-dwelling unit to provide the supporting wiring and power resources. A power feed is typically wired directly to the content distribution components within the multi-dwelling unit. Because an electrical contractor must visit the site as well as provide a lock box for the components and power supply, many owners/landlords of smaller multi-dwelling units may be hesitant to provide for and fund such services.

SUMMARY

The present disclosure provides a system and method for providing content distribution services to a multi-dwelling unit (MDU) in which a "unit configuration" (i.e., the configuration of receivers and other supporting equipment associated with an individual housing unit within the MDU) is capable of powering a multi-switch distribution system without the inherent drawback set forth above.

In one aspect of the disclosure, a system for distributing television signals includes a multi-switch module multiplexing television signals therethrough. The system further includes a plurality of unit configurations having respective power sources therein. The plurality of unit configurations receives the television signals. The system also includes a splitting module in communication with the multi-switch module and the plurality of unit configurations whereby at least one of the unit configurations powers the multi-switch module.

In another aspect of the disclosure, a method includes communicating a plurality of voltage signals from a plurality of unit configurations of a multi-dwelling unit to a splitting module, communicating less than the plurality of voltage signals from the splitting module to a multi-switch module.

In yet another aspect of the disclosure, a system for use with a multi-switch module having a first port for receiving a first voltage signal and outputting channel signals, a second port for receiving a second voltage signal, a third port for outputting channel signals includes a first steered splitter having a fourth port in communication with a first power supply in a first unit configuration a fifth port in communication with a second power supply in a second unit configuration and sixth port in communication with the first port. The system further includes a second steered splitter having a seventh port in communication with a third power supply in a third unit configuration, an eighth port in communication with a fourth power supply in a fourth unit configuration and a ninth port in communication with a tenth port of a third splitter. The third splitter comprises an eleventh port in communication with the second port and a twelfth port in communication with the third port.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content, such as metadata, as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Figure 1:
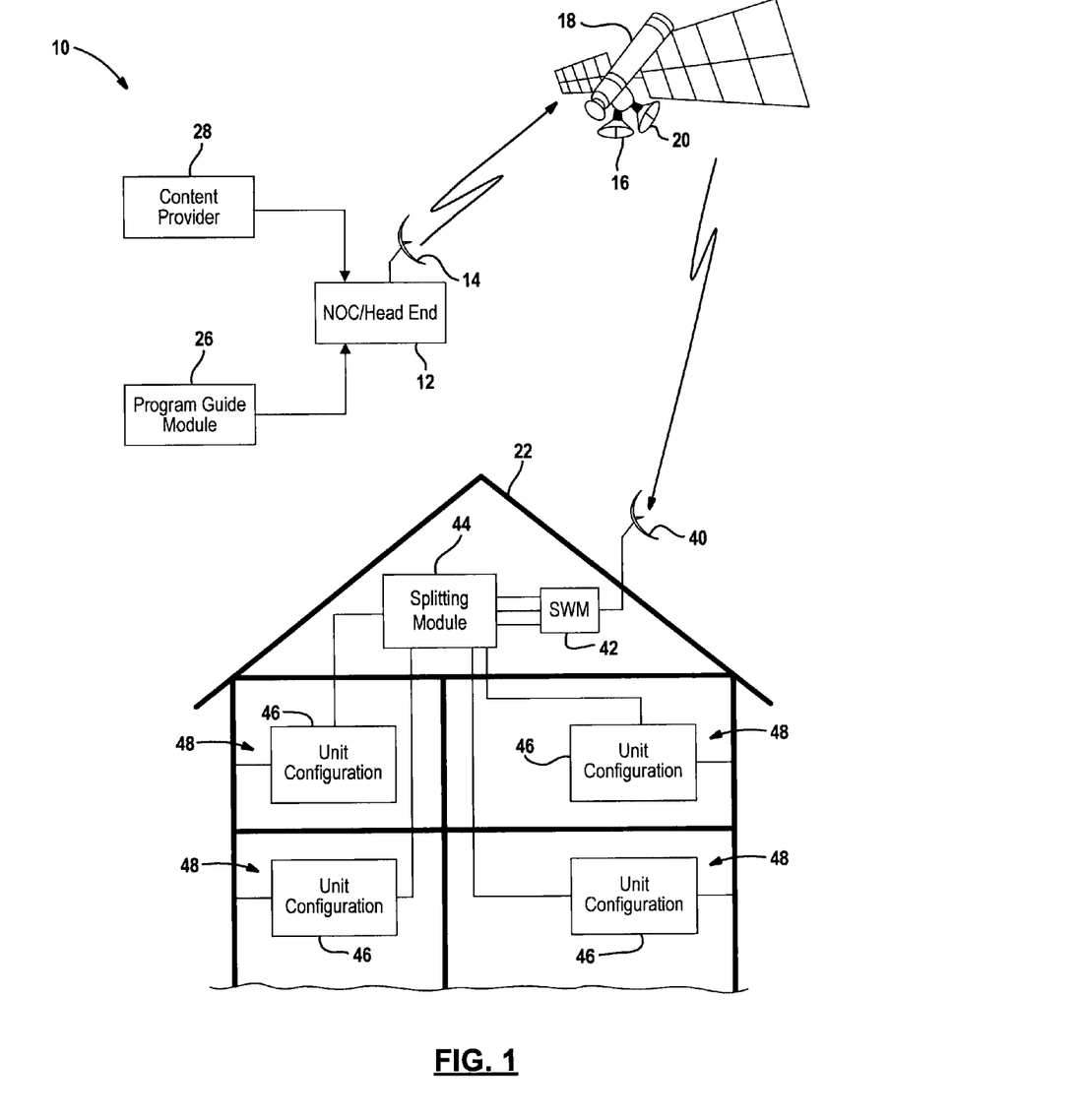
FIG. 1 is a high level block diagrammatic view of a content distribution system such as a satellite television broadcasting system.

Referring now to FIG. 1, a satellite television broadcasting system 10 is illustrated. The satellite television broadcasting system 10 includes an operational headend or network operations center (NOC) 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a building 22 or property with multiple buildings. The building 22 may be a multiple dwelling unit (MDU) which individual unit configurations are desirable.

The wireless signals may have various types of data associated with them including various channel information such as a channel or program guide, metadata, location information and the like. The guide data may be received from the network operations center 12 or external headend. The wireless signals may also have various video and audio signals associated therewith.

The program guide data may be received from a program guide module 26. The program guide module 26 may communicate various objects to the network operations center 12. Various types of data may be communicated about the programming and grid guide including the channel number, a network identifier, program data such as a start and end time of airing, title, numerical identifier, content data such as actors, descriptions, ratings and the like. Program guide data may include the relative positions of the data, the line structures for forming the grid for the program guide and the like.

A content provider 28 may provide content to the network operations center 12. The content provider 28 may include various television networks that provide programming and content for a particular channel as well as on-demand and pay-per-view providers that provide content for communication at particular times over channels specified at the network operations center 12.

Building 22 includes a receiving antenna (e.g., satellite dish) 40 that receives the wireless signals from the satellite 18. Although only one antenna 40 is illustrated, more antennas may be provided.

The antenna or plurality of antennas 40 are in communication with a single-wire multi-switch (SWM) module 42. As will be described below, more than one single-wire multi-switch may be included within a system. The single-wire multi-switch module 42 is used to multiplex signals on one or more outputs. In some embodiments, the multiplexed output signals may have frequencies designated for use by particular user receiving device tuners within building 22.

A splitting module 44 is in communication with the single-wire multi-switch module 42. The splitting module 44 may split the channel signals for distribution to various unit configurations 46. Each unit configuration 46 corresponds to a user receiving device configuration within each of the individual units 48 within the building 22. The splitting module 44 and unit configuration 46 are described further below. By way of example, four individual units 48 are illustrated, each having a respective unit configuration 46.

Figure 2:
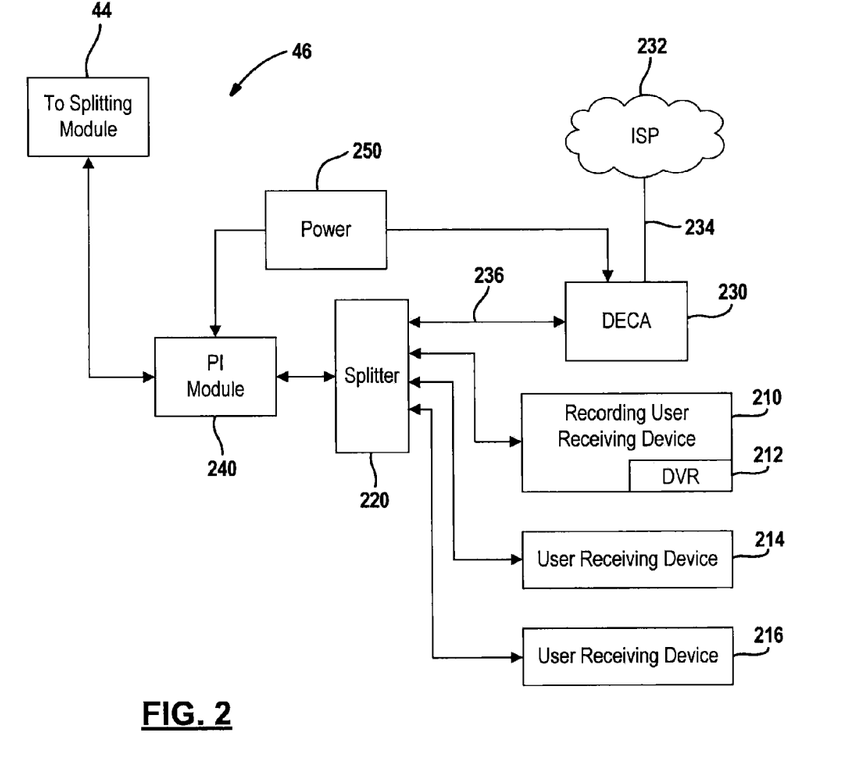
FIG. 2 is a block diagrammatic view of an example embodiment of the unit configuration of FIG. 1.

Referring now to FIG. 2, one embodiment for a unit configuration 46 is set forth. As will be described further below, various numbers of user receiving devices may be used. In this example, a first user receiving device is a recording user receiver device 210. A digital video recorder is provided as an example of a memory used for recording content. The digital video recorder 212 may comprise a hard drive or other types of chip-based memory such as FLASH memory. The user receiving device 210 may be used for receiving satellite signals or terrestrial over the air signals. Further, the user receiving device 210 may be used for receiving cable television signals. Of course, it should be noted that various numbers of recording user receiving devices 210 and user receiving devices 214, 216 may be used in a particular configuration. Each of the recording user devices 210 and the user receiving devices 214, 216 are in communication with a splitter 220. The splitter 220 ultimately receives signals from the splitting module 44.

In some embodiments, a DIRECTV® Ethernet Coaxial Adapter (DECA) 230 may be in communication with an internet service provider 232 (e.g., via an Ethernet router, gateway, broadband modem and/or other Internet access device) and the splitter 220. Between the ISP 232 and DECA a category 5 cable 234 may be used. Of course, other suitable IP cables may be used. The DECA 230 is used to convert the internet service provider signals into a coaxial format (e.g., Multimedia Over Coaxial Alliance MOCA®) for communication to the splitter 220 through a coaxial cable 236. The coaxial cable may be, for example, RG6 or RG11 depending on the distance. RG11 may be more suitable for longer distances. The splitter 220 may distribute the internet signals to the recording user receiving device 210 and the user receiving devices 214, 216. Likewise, signals from the recording user receiving device 210 and the user receiving devices 214, 216 may be communicated to the splitter 220 and ultimately to the internet service provider 232 through the DECA 230.

A power injection (PI) module 240 may be used to inject power onto the cable from the splitting module 44. A relatively low power such as 29 watts may be provided to the splitting module 44. Both channel signals and power may thus occupy the same cable.

PI module 240 is powered from a power source 250 (e.g., an AC/DC adapter/converter plugged into a wall socket of the housing unit), which may also be used to power DECA 230. (Although not illustrated, the recording user receiving device 210, the user receiving device 214 and the user receiving device 216 are also coupled to a power source.) A suitable power injection module 240 as illustrated in U.S. patent application Ser. No. 11/098,724, the disclosure of which is incorporated by reference herein.

The cable connections between the splitter 228 and the user receiving devices 210, 214, 216 and the splitter 220 and the splitting module 44 may all be coaxial cable.

Figure 3:
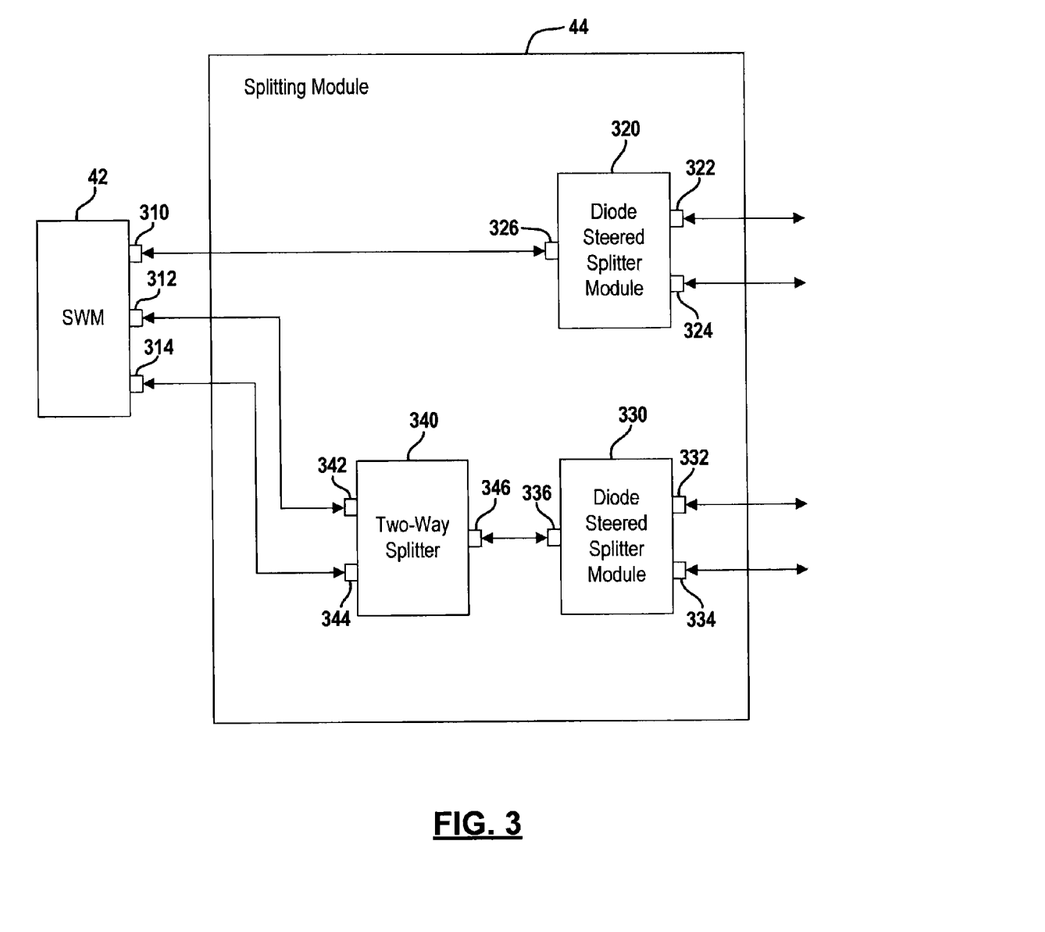
FIG. 3 is a block diagrammatic view of a first example embodiment of a splitting module according to FIG. 1.

Referring now to the FIG. 3, a first embodiment of a splitting module 44 is set forth. The single-wire multi-switch module 42 includes a first port 310 that is capable of transmitting multiplexed channel signals therethrough. The first port 310 is also capable of receiving input power to power the single-wire multi-switch module 42. Ultimately the power into port 310 may originate from one PI module 240 from one unit configuration 46 as is illustrated in FIG. 2.

The second port 312 of the single-wire multi-switch module 42 is used for receiving power. In this example, the second port 312 is a dedicated power input port.

The single-wire multi-switch module 42 may also include a third port 314. The third port 314 is a dedicated channel output port. A plurality of channels may be multiplexed onto the same wire extending from the output port 314.

The splitting module 44 may include a first diode steered splitter module 320. The first diode steered splitter module 320 may include a fourth port 322 that is in communication with a first unit configuration in the MDU (e.g., a first apartment in an apartment building/complex). In particular, the fourth port 322 may be in communication with the PI module 240 located in unit configuration 46 illustrated in FIG. 2.

The diode steered splitter module 320 may also include a fifth port 324 that is in communication with a second unit configuration. In particular, the fifth port 324 may be in communication with a second PI module 240 located in a second unit configuration (e.g., a second apartment).

The diode steered splitter module 320 also includes a sixth port 326 that is in communication with the first port 310 of the single-wire multi-switch 42. Sixth port 326 may receive multiplexed channel signals from the first port 310. The diode steered splitter module 320 may communicate the multiplexed channel signals from the sixth port 326 to the fourth and fifth ports 322, 324. Likewise, power from the PI modules 240 located in different unit configurations may communicate power to the sixth port 326. A description of the power communication is described below. Generally, the port 322 or 324 having the highest voltage provides the output through the sixth port 326.

A second diode steered splitter module 330 is configured in similar manner to the diode steered splitter module 320 described above. In this example a seventh port 332 and an eighth port 334 are in communication with PI modules 240 located in a third and fourth unit configurations. A ninth port 336 is in communication with a two-way splitter 340. In particular, a tenth port 346 of the two-way splitter is in communication with the ninth port 336. An eleventh port 342 is in communication with the second port 312 of the single-wire multi-switch. A twelfth port 344 is in communication with the third port 314 of the single-wire multi-switch 42. The two-way splitter 340 splits the signal from the tenth port 346. In reverse, the two-way splitter 340 combines the signals from the eleventh port 342 and the twelfth port 344 at the tenth port 346.

In this manner, when a power signal is selected at the diode steered splitter module 330, the eleventh port 342 provides power to the dedicated power port 312. In the reverse direction, multiplexed channel signals from the third port 314 are combined with the power signal from the eleventh port 342.

Figure 4:
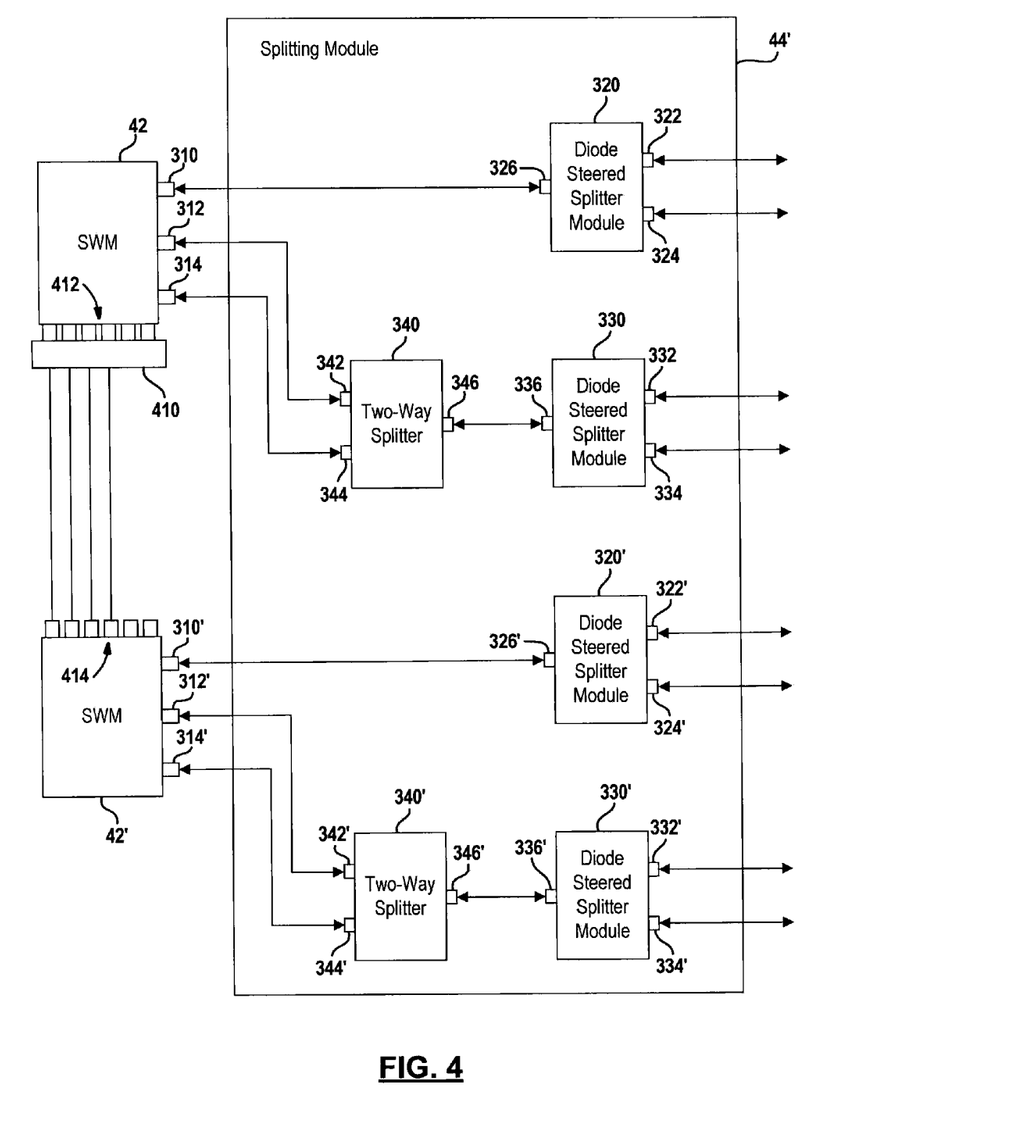
FIG. 4 is a block diagrammatic view of a second example embodiment of the splitting module of FIG. 1.

Referring now to FIG. 4, a splitting module 44' suitable for a larger multi-dwelling unit is set forth. In this example the splitting module configuration is duplicated twice. The same reference numbers are used for the same components as those of FIG. 3. The lower half of the figure is labeled with primed reference numerals. In addition to the above, an extender 410 is illustrated for joining a first group of ports 412 with a second group of ports 414 on respective SWM modules 42 and 42 prime.

By joining the SWM modules 42 and 42' more unit configurations can be added to the system. By joining SWM modules a single antenna and antenna connection can be shared therebetween. An initial system capable of a limited number of unit configurations can be deployed to keep costs low. As more subscribers are added, more SWM modules may be added together in the manner illustrated in FIG. 4. More than two SWM modules may be added together when more unit configurations are required.

Figure 5:
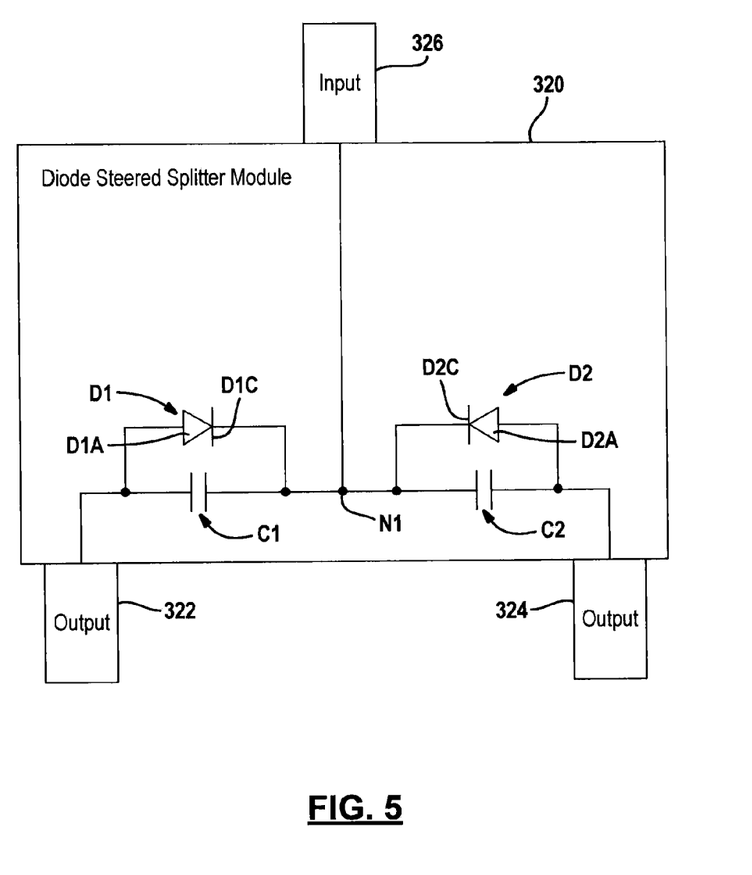
FIG. 5 is a block diagrammatic view of an example embodiment of the steered diode splitter of FIGS. 3 and 4.

Referring now to FIG. 5, one embodiment of a diode steered splitter module 320 is illustrated. Each of the diode steered splitter modules may be configured in a similar manner. In this example, diode steered splitter module 320 includes the port 326 which is split into the port 322 and port 324. Internally, a common input node N1 associated with input 326 has a capacitor C1 between the node N1 and the output 322. A diode D1 having an anode D1A and a cathode D1C is in parallel with the capacitor C1. Further, a capacitor C2 is disposed between the node N1 and the port 324. A second diode D2 having a cathode D2C and an anode D2A is set forth. The anodes D2A, D1A and one end of the capacitors C1 and C2 are electronically coupled to the respective port 322, 324. Ports 322, 324 act as output nodes. The cathodes are electrically coupled to the node N1. In this manner, the highest voltage across the diodes allows the diode to pass a DC voltage signal to the input port 326. This in turn powers the SWM module.

Figure 6:
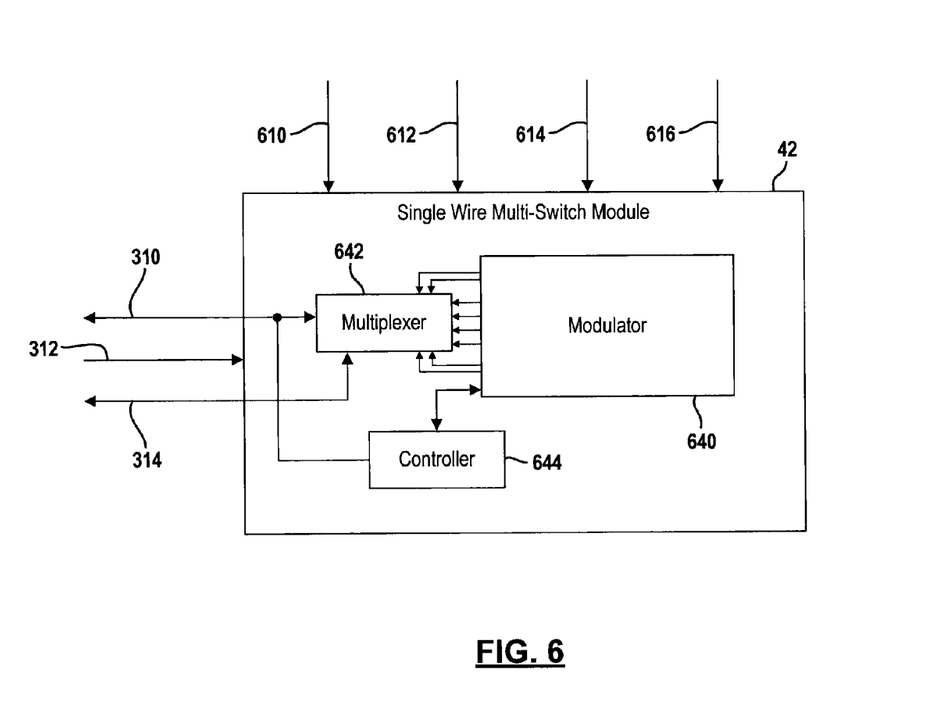
FIG. 6 is a block diagrammatic view of an example embodiment of the single wire multi-switch module illustrated in FIG. 1.

Referring now to FIG. 6, the single-wire multi-switch module (switch module) 42 is illustrated in further detail. In this embodiment, four inputs 610, 612, 614, and 616 are illustrated. The inputs 610, 612, 614 and 616 may receive satellite signals from low-noise block amplifier (LNB) circuits (not shown) associated with receive antenna 40. For example, each input may receive one or more LNB signals each corresponding to a specific orbital slot, satellite frequency band (e.g., Ku, Ka-High, Ka-Low) and polarization. The single-wire multi-switch module 42 may also include output ports 310 and 314, as described above, that are used for receiving tuning requests from respectively coupled downstream user receiving devices and transmitting corresponding service channel signals frequency multiplexed onto the given output port. The tuning requests may include information identifying the orbital slot, satellite frequency band, polarization and specific transponder signal that carries the desired service channel. (The mapping of service channels to their corresponding satellite/transponder information is maintained at the user receiving device, e.g., as part of program guide information.)

The inputs 610, 612, 614 and 616, for example, correspond to different combinations of satellite signals (e.g., grouped according to orbital slot, satellite frequency band, and polarization) received from low-noise block amplifier (LNB) circuits (not shown) associated with receive antenna 40.

The single-wire multi-switch module 42 assigns particular output carrier frequencies to respective tuner modules within the user receiving devices that desire a channel signal. Thus, each of the tuner modules is assigned a different frequency band for communication. A modulator module 640 is used for providing the modulated signals. Each of the user receiving devices thus generates a request for a channel from one of the inputs 610-616. The channels are then modulated into the frequency corresponding to the tuner of the user receiving device. The frequency signals may be combined onto the output 620 using a multiplexer 642. The splitter module 44 illustrated above splits the combined signal for each tuner or user receiving device. Every tuner may receive every requested channel but only the channel (frequency) corresponding thereto is displayed. A controller 644 controls the communication and the modulator modules 640 to provide the proper signal for the user device within the unit. Various numbers of devices and/or tuners may be provided depending upon the size of the single-wire multi-switch module. Program guide data may be communicated through the inputs 610-616. A suitable single wire multi-switch module is illustrated in U.S. patent application Ser. No. 11/097,724, which was previously incorporated by reference herein.

Figure 7:
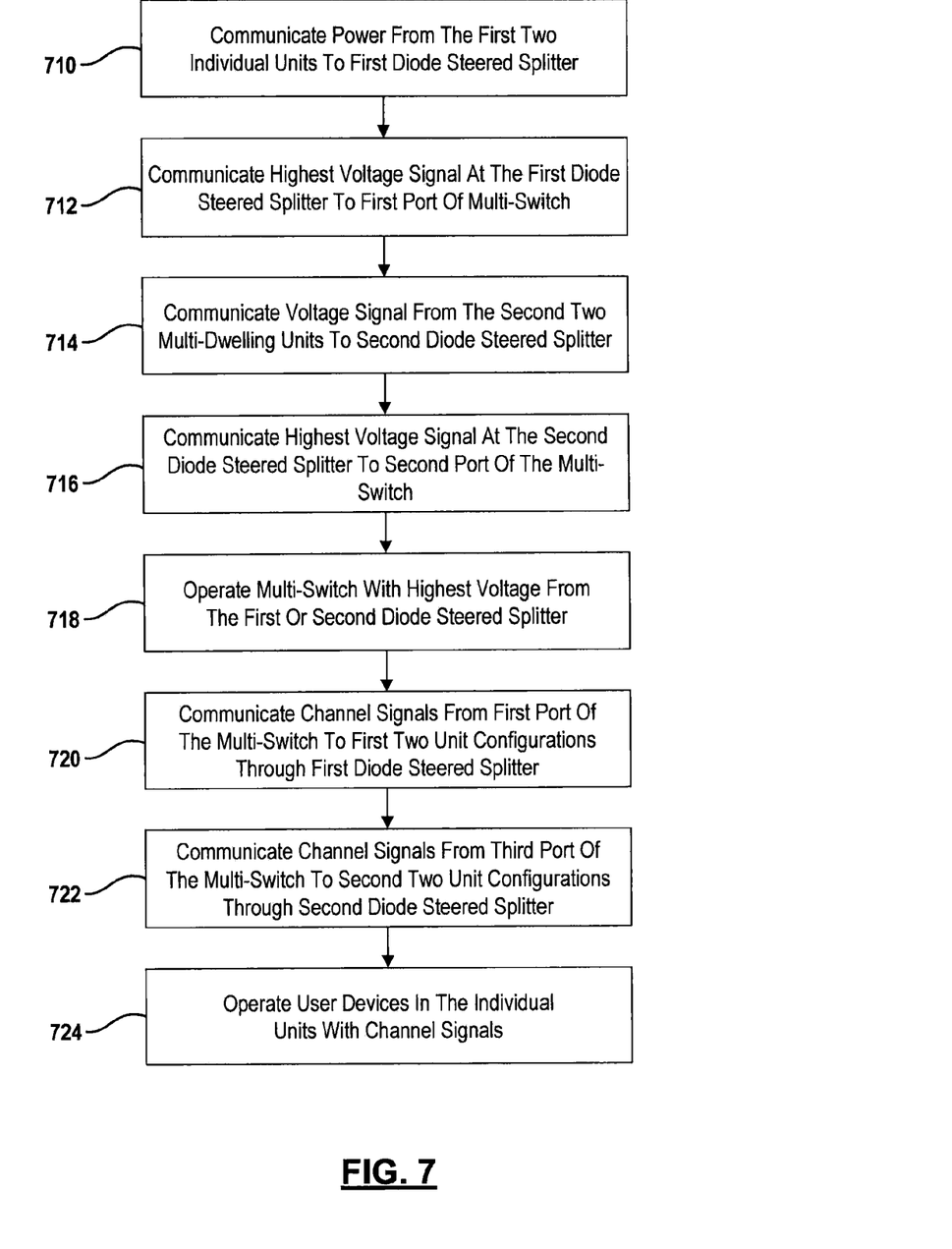
FIG. 7 is a block diagrammatic view of an example embodiment of a dual single wire multi-switch module according to FIG. 1.

Referring now to FIG. 7, a method for operating a system for a multi-dwelling unit comprising four individual unit configurations is set forth. Of course, the present method may be extended to multi-dwelling units having various numbers of individual unit configurations.

In step 710, a voltage signal is communicated from the first two unit configurations to a first diode steered splitter. Power is generated within each dwelling unit 48 at a PI module 240 illustrated in FIG. 2. In step 712, the highest voltage received at the diode steered splitter is communicated through the port of the splitter adjacent to the SWM module. In step 714 a voltage signal from the second two unit configurations is communicated to a second diode steered splitter. In step 716 the highest voltage signal at the second diode steered splitter is communicated to the multi-switch port. More than one voltage signal could be combined to power the SWIM module as well. Steps 712 and 716 may use the diodes within the diode steered splitter to route the appropriate voltage signal to the output of the diode steered splitter. Changes in cable length and the lack of a subscriber may affect the voltage provided to the diode steered splitters. Longer cable runs reduce the voltage provided to the diode steered splitter. Both pairs of diode steered splitters ultimately provide power to the single-wire multi-switch. The highest voltage signal provided on the first port of the single-wire multi-switch or the second port is used to power the multi-switch.

Once the single-wire multi-switch is powered, channel signals may be provided to the various unit configurations. In step 720 channel signals are provided from the first port of the multi-switch to the first two unit configurations through the first diode steered splitter. As mentioned above, the multi-switch may have various frequencies assigned to individual tuners within each unit configuration. Channel signals are provided from the first port of the multi-switch to the first two unit configurations through the first diode steered splitter in step 720.

In step 722 channel signals are communicated from the third port of the multi-switch to a second group of unit configurations through a second diode steered splitter. Again, the specific frequencies may be assigned to specific tuners in the second group of multi-dwelling units.

In step 724 the channel signals communicated to the tuners are displayed on the user devices associated with the tuners. In step 724 the user devices are operated with the channel signals. The channel signals may also include various types of data such as program guide data. The respective tuners are part of the unit configurations for each individual unit of the multi-dwelling unit.

In the operation of the above configuration, when one or more multi-dwelling units are not subscribed to the system, their power injectors are also disabled or are absent. Therefore another unit configuration is capable of providing power at any time to the multi-switch. Ultimately, the highest voltage signal provided to the multi-switch will be used to operate the multi-switch. Therefore, dedicated power supplies at the building level are not required. Each individual unit through its associated unit configuration may at some point provide power to the multi-switch.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system for distributing television signals comprising:
    a multi-switch module multiplexing television signals therethrough;
    a plurality of unit configurations having a respective power source therein, said plurality of unit configurations receiving the television signals; and
    a splitting module in communication with the multi-switch module and the plurality of unit configurations whereby the splitting module communicates the television signals to the plurality of unit configurations and at least one of the unit configurations powers the multi-switch module through the splitting module.

2. The system as recited in claim 1 wherein each of the plurality of unit configurations comprises a user receiving device.

3. The system as recited in claim 1 wherein each of the plurality of unit configurations comprises a satellite user receiving device.

4. The system as recited in claim 1 wherein each of the plurality of unit configurations comprises a recording user receiving device.

5. The system as recited in claim 1 wherein the splitting module comprises a plurality of diode steered splitters.

6. The system as recited in claim 5 wherein each of the plurality of diode steered splitters comprise a diode in parallel with capacitor between an input node and an output node.

7. The system as recited in claim 1 further comprising a satellite antenna in communication with the multi-switch module.

8. The system as recited in claim 1 wherein each of the plurality of unit configurations comprises a power injection module.

9. A method comprising:
communicating television signals to a plurality of unit configurations of a multi-dwelling unit through a multi-switch module;
communicating a plurality of voltage signals from the plurality of unit configurations of the multi-dwelling unit to the splitting module; and
powering the multi-switch module with at least one of the plurality of voltage signals from the splitting module.

10. The method as recited in claim 9 wherein communicating the plurality of voltage signals comprises communicating the plurality of voltage signals from a power injection module in each of the plurality of unit configurations.

11. The method as recited in claim 9 wherein communicating the plurality of voltage signals comprises communicating a first voltage signal from a first power injection module in a first individual unit of the multi-dwelling unit until the first power injection module is disabled and from a second voltage signal from a second power injection module in a second individual unit of the multi-dwelling unit.

12. The method as recited in claim 9 further comprising communicating a plurality of multiplexed channel signals from the multi-switch module to the plurality of unit configurations through the splitting module.

13. A system comprising:
a multi-switch module comprising a first port for receiving a first voltage signal and outputting television signals, a second port for receiving a second voltage signal, and a third port for outputting signals;
a first steered splitter outputting television signals to a first unit configuration and a second unit configuration and having a fourth port in communication with a first power supply in a first unit configuration, a fifth port in communication with a second power supply in a second unit configuration and sixth port in communication with the first port;
a second steered splitter outputting television signals to a third unit configuration and a fourth unit configuration and having a seventh port in communication with a third power supply in a third unit configuration, an eighth port in communication with a fourth power supply in a fourth unit configuration and a ninth port in communication with an tenth port of a third splitter; and
said third splitter outputting television signals through the tenth port and comprising an eleventh port in communication with the second port and a twelfth port in communication with the third port;
whereby at least one of the first unit configuration, the second unit configuration, the third unit configuration and the fourth unit configuration powers the multi-switch module through at least one of the first steered splitter and the second steered splitter.

14. A system as recited in claim 13 wherein the multi-switch module comprises a single wire multi-switch module.

15. A system as recited in claim 13 wherein the multi-switch module multiplexes television channel signals.

16. A system as recited in claim 13 wherein the first power supply comprises a power injection module.

17. A system as recited in claim 13 wherein the first power supply, the second power supply, the third power supply and the fourth power supply each comprises a respective power injection module disposed within a respective unit configuration.

18. A system as recited in claim 17 wherein each respective unit configuration comprises a fourth splitter in communication a user receiving device.

19. A system as recited in claim 17 wherein each respective unit configuration comprises a fourth splitter in communication a user receiving device and a coaxial adapter in communication with an internet service provider.

20. A system as recited in claim 13 wherein each respective unit configuration comprises a user receiving device.

21. A system as recited in claim 13 wherein each respective unit configuration comprises a satellite user receiving device.

22. A system as recited in claim 13 wherein the first steered splitter comprises a diode steered splitter.

23. A system as recited in claim 22 wherein the diode steered splitter comprises a diode in parallel with capacitor between an input node and an output node.

24. The system as recited in claim 13 further comprising a satellite antenna in communication with the multi-switch module.

25. The systems as recited in claim 13 wherein the first unit configuration is disposed within a first individual unit of a multi-dwelling unit, the second unit configuration is disposed within a second individual unit of the multi-dwelling unit, the third unit configuration is disposed within a third individual unit of the multi-dwelling unit, and the fourth unit configuration is disposed within a fourth individual unit of the multi-dwelling unit.

* * * * *